（12） United States Patent
Matsunaga et al.

(10) Patent No.: US 10,639,939 B2
(45) Date of Patent: May 5, 2020

(54) PNEUMATIC TIRE

(71) Applicant: BRIDGESTONE CORPORATION, Tokyo (JP)

(72) Inventors: Ietomo Matsunaga, Tokyo (JP); Tadashi Wakiyama, Koganei (JP)

(73) Assignee: BRIDGESTONE CORPORATION, Tokyo (JP)

( * ) Notice: Subject to any disclaimer, the term of this patent is extended or adjusted under 35 U.S.C. 154(b) by 431 days.

(21) Appl. No.: 15/312,152

(22) PCT Filed: Apr. 22, 2015

(86) PCT No.: PCT/JP2015/062218
§ 371 (c)(1),
(2) Date: Nov. 17, 2016

(87) PCT Pub. No.: WO2015/178152
PCT Pub. Date: Nov. 26, 2015

(65) Prior Publication Data
US 2017/0100966 A1 Apr. 13, 2017

(30) Foreign Application Priority Data
May 20, 2014 (JP) .................................. 2014-104046

(51) Int. Cl.
B60C 11/13 (2006.01)
B60C 11/03 (2006.01)
B60C 5/00 (2006.01)

(52) U.S. Cl.
CPC ............ B60C 11/1323 (2013.01); B60C 5/00 (2013.01); B60C 11/03 (2013.01);
(Continued)

(58) Field of Classification Search
CPC ..... B60C 11/13; B60C 11/03; B60C 11/1307; B60C 11/1323; B60C 11/1315;
(Continued)

(56) References Cited

U.S. PATENT DOCUMENTS 5,407,005 A * 4/1995 Consolacion ........... B60C 11/11
152/209.9
2004/0050470 A1 3/2004 Nishi
(Continued)

FOREIGN PATENT DOCUMENTS

CN 1494489 A 5/2004
CN 101631684 A 1/2010
(Continued)

OTHER PUBLICATIONS

JP 2002-29219, English language machine translation [epo.org] (Year: 2002).*
(Continued)

Primary Examiner — Eric Hug
(74) Attorney, Agent, or Firm — Oliff PLC

(57) ABSTRACT

A pneumatic tire includes a tread having a tread surface, circumferential main grooves on the tread, and land portions formed between the circumferential main grooves. Each of the circumferential main grooves has, in a lateral cross-sectional view, a groove bottom surface, an outside groove wall surface, an inside groove wall surface, an outside curved portion connecting the groove bottom surface with the outside groove wall surface, and an inside curved portion connecting the groove bottom surface with the inside groove wall surface. In the lateral cross-sectional view, (a minimum curvature radius of the outside curved portion)>(a minimum curvature radius of the inside curved portion) is satisfied. (the groove wall angle α [between a tread normal line and the outside groove wall surface])<(the groove wall angle β
(Continued)

[between a tread normal line and the inside groove wall surface]) is satisfied.

4 Claims, 3 Drawing Sheets

(52) U.S. Cl.
CPC ...... *B60C 11/0302* (2013.01); *B60C 11/0304* (2013.01); *B60C 11/13* (2013.01)

(58) Field of Classification Search
CPC ........... B60C 2011/133; B60C 11/1353; B60C 11/1384; B60C 11/1392
USPC ....................................... 152/209.15, 209.24
See application file for complete search history.

(56) References Cited

U.S. PATENT DOCUMENTS

| | | | |
|---|---|---|---|
| 2006/0011280 A1* | 1/2006 | Yagita | ................. B60C 11/0306 152/209.24 |
| 2010/0116395 A1 | 5/2010 | Andou | |
| 2011/0192516 A1* | 8/2011 | Yamaguchi | ......... B60C 11/0306 152/209.24 |
| 2012/0042998 A1* | 2/2012 | Ueda | ................... B60C 11/0309 152/209.18 |
| 2015/0075686 A1 | 3/2015 | Suga | |
| 2015/0210122 A1* | 7/2015 | Shimizu | .............. B60C 11/1259 152/209.25 |

FOREIGN PATENT DOCUMENTS

| | | | |
|---|---|---|---|
| CN | 102216092 A | | 10/2011 |
| EP | 1 926 610 B1 | | 11/2011 |
| JP | 63-68406 | * | 3/1988 |
| JP | H03-042306 A | | 2/1991 |
| JP | 2001-287510 A | | 10/2001 |
| JP | 2002-29219 | * | 1/2002 |
| JP | 2009-214759 A | | 9/2009 |
| JP | 2012-041008 A | | 3/2012 |
| JP | 2013-224132 A | | 10/2013 |
| JP | 5482938 B1 | | 5/2014 |

OTHER PUBLICATIONS

Jul. 21, 2015 International Search Report issued in International Patent Application No. PCT/JP2015/062218.
Aug. 24, 2017 Search Report issued in Chinese Patent Application No. 201580026657.8.
Mar. 8, 2018 Search Report issued in Chinese Patent Application No. 201580026657.8.
May 8, 2017 Extended European Search Report issued in European Patent Application No. 15795565.9.

* cited by examiner

PNEUMATIC TIRE

TECHNICAL FIELD

The present invention relates to a pneumatic tire.

BACKGROUND ART

A Patent Document 1 listed below discloses a pneumatic tire whose stiffness against a lateral input force is improved by increasing a volume of rubber by increasing a minimum curvature radius of an outside curved portion of an inner surface of a groove.

Figure 4:
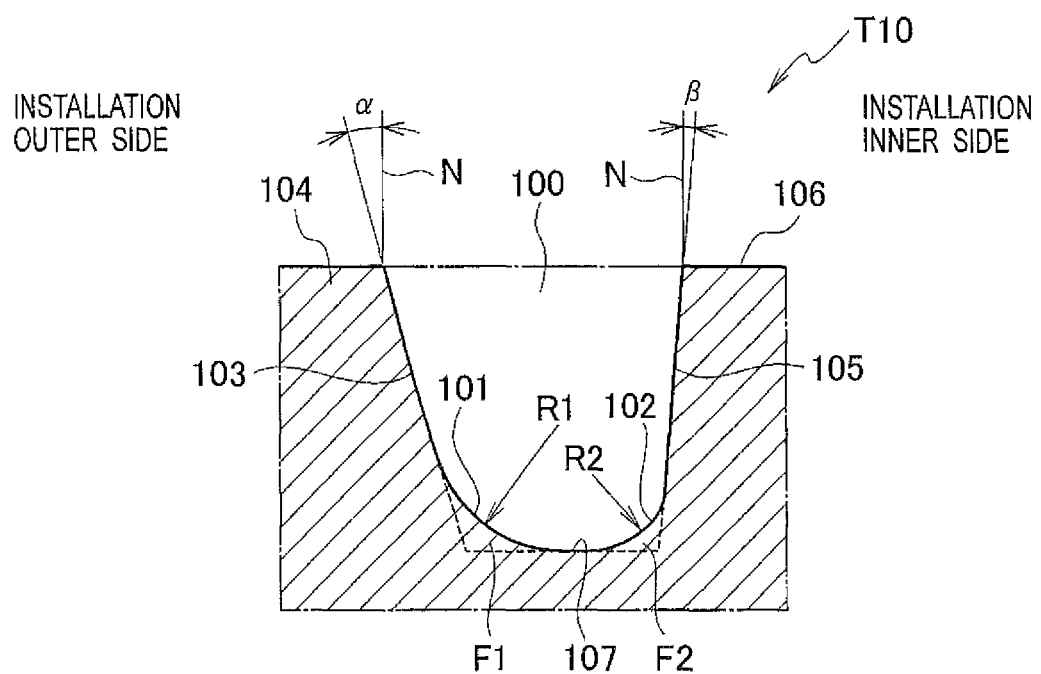

As shown in FIG. 4, in the pneumatic tire T10 disclosed in the Patent Document 1, in a lateral cross-sectional view of a circumferential main groove 100, an inequality (a minimum curvature radius R1 of an outside curved portion 101)>(a minimum curvature radius R2 of an inside curved portion 102) is satisfied. In addition, in the lateral cross-sectional view, with respect to angles (groove wall angles) of groove wall surfaces 103, 105 to a normal line(s) N of a tread surface 106 (hereinafter, this is called as a tread normal line) at border edges between the groove wall surfaces 103, 105 and the tread surface 106, an inequality (the groove wall angle $\alpha$ on an installation outer side)>(the groove wall angle $\beta$ on an installation inner side) is satisfied. The "installation outer/inner side" is an outer/inner side with respect to a body of a vehicle when the tire T10 is installed on the vehicle. The "outside/inside curved portion" is similar thereto. According to these configurations, reduction of a lateral input force at edges of land portions (blocks and ribs) 104 is restricted and thereby a larger lateral force is generated, so that dynamic performance and handling stability are improved.

PRIOR ART DOCUMENT

Patent Document

Patent Document 1: EP 1 926 610 B1

SUMMARY OF INVENTION

However, in the pneumatic tire T10 disclosed in the Patent Document 1, since the groove wall angle on a side, whose minimum curvature radius is smaller, of a groove bottom surface 107 is made smaller ($\alpha$>$\beta$ in FIG. 4), strain concentrates to the side whose minimum curvature radius is smaller (the inside curved portion 102) and thereby an inclining deformation of the land portion(s) 104 adjacent to the inside curved portion 102 becomes prominent. As the result, handling stability gets worse. In addition, it is concerned that cracks caused by the strain concentration to the side, whose minimum curvature radius is smaller, of the groove bottom surface 107 (the inside curved portion 102) occur. If the cracks occur, the inclining deformation of the land portion(s) becomes more prominent.

An object of the present invention is to provide a pneumatic tire that can effectively resist a lateral input force from an installation outer side during cornering and thereby can restrict an inclining deformation of a land portion to improve handling stability.

An aspect of the present invention provides a pneumatic tire comprising: a tread that has a tread surface; a plurality of circumferential main grooves that are formed on the tread; and a plurality of land portions that are formed, on the tread, between the plurality of circumferential main grooves, wherein each of the plurality of circumferential main grooves has, in a lateral cross-sectional view, a groove bottom surface, an outside groove wall surface located on an installation outer side, an inside groove wall surface located on an installation inner side, an outside curved portion connecting the groove bottom surface with the outside groove wall surface, and an inside curved portion connecting the groove bottom surface with the inside groove wall surface, (a minimum curvature radius of the outside curved portion)>(a minimum curvature radius of the inside curved portion) is satisfied in the lateral cross-sectional view, and, when, in the lateral cross-sectional view, an angle of the outside groove wall surface to a tread normal line at a border edge between the outside groove wall surface and the tread surface is denoted as a groove wall angle $\alpha$ and an angle of the inside groove wall surface to a tread normal line at a border edge between the inside groove wall surface and the tread surface is denoted as a groove wall angle $\beta$, (the groove wall angle $\alpha$)<(the groove wall angle $\beta$) is satisfied.

BRIEF DESCRIPTIONS OF DRAWINGS

Figure 1:
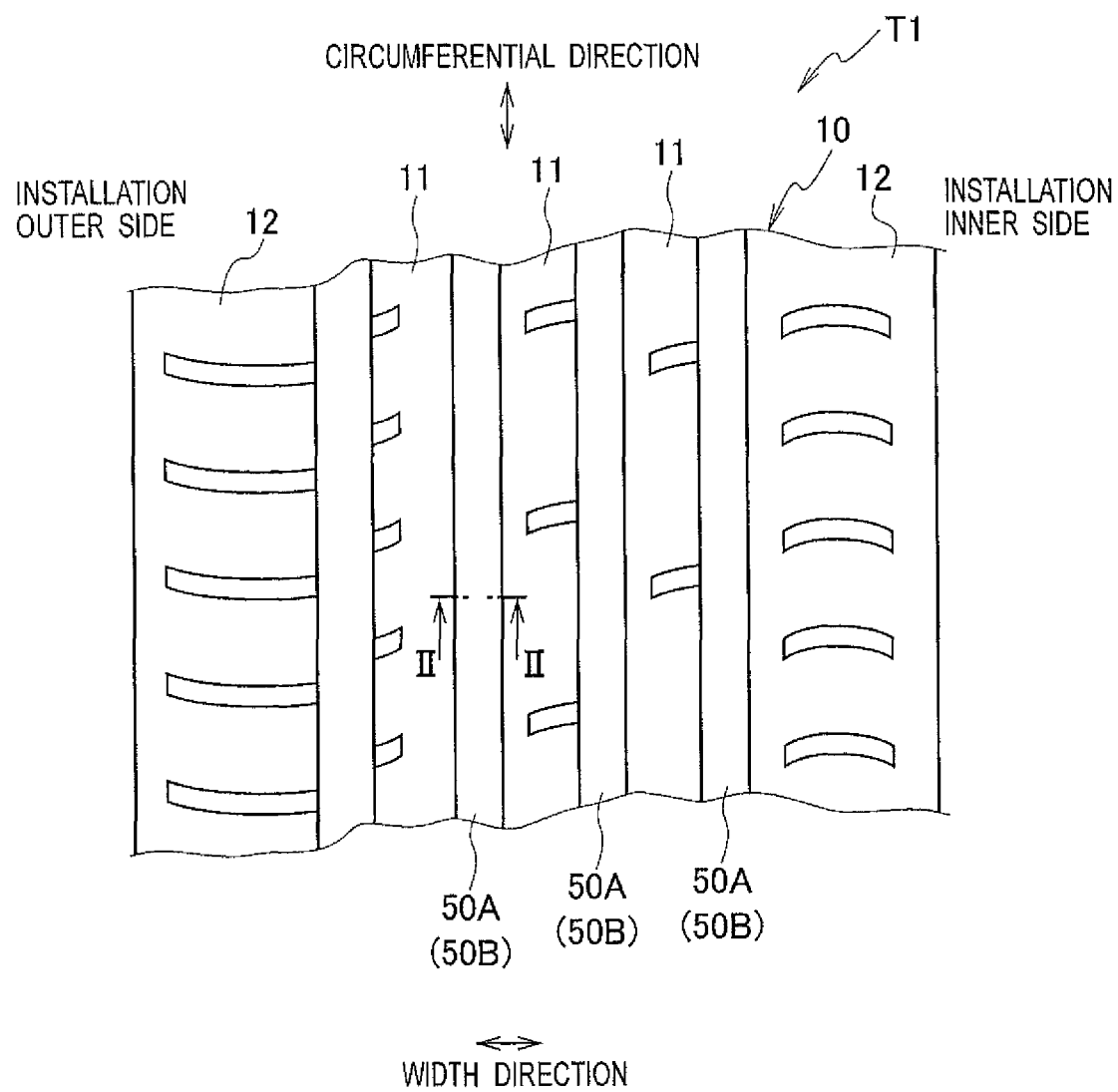

FIG. 1 It is a development view of a tread surface of a pneumatic tire according to an embodiment.

Figure 2:
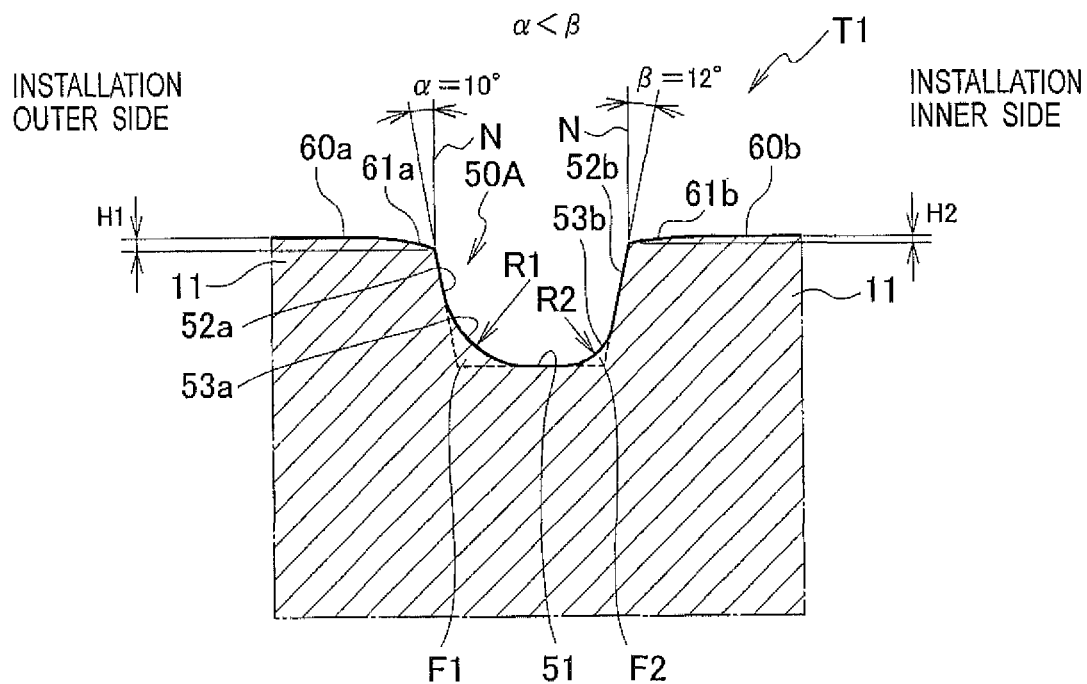

FIG. 2 It is a cross-sectional view taken along a line II-II shown in FIG. 1.

Figure 3:
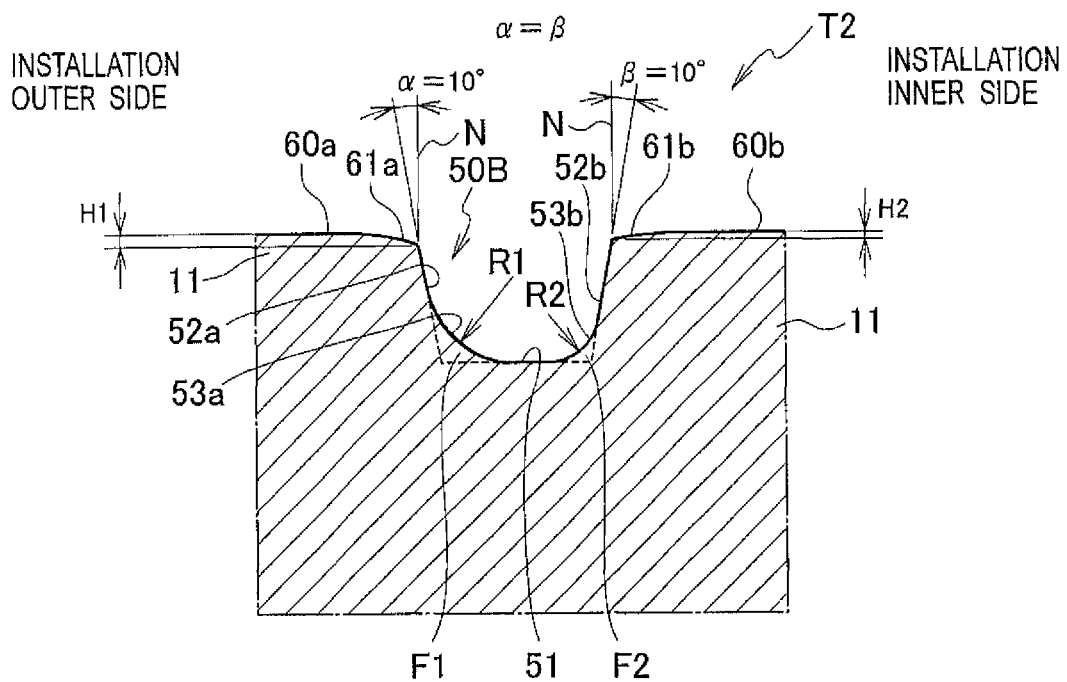

FIG. 3 It is a cross-sectional view of a circumferential main groove according to a comparative sample.

FIG. 4 It is a cross-sectional view of a circumferential main groove of a pneumatic tire according to a prior art.

DESCRIPTION OF EMBODIMENTS

Hereinafter, an embodiment will be described with reference to the drawings. Configurational elements identical or equivalent to each other are labeled with identical signs. Note that the drawings show configurational elements schematically, and it should be understood that the configurational elements shown in the drawings don't indicate their actuals. Further, actual dimensions of the configurational elements and actual proportions between the configurational elements may be shown differently in the drawings.

Dimensions, angles and so on are measured in a state where the tire is mounted onto an applied rim, a regulated inner pressure is applied thereto, and no load is applied thereto. The "regulated inner pressure" denotes an air pressure regulated according to a maximum load rating in a Standard. The "applied rim" denotes a rim regulated according to a tire size in the Standard. In Japan, the above-mentioned Standard denotes "JATMA YEAR BOOK (here, 2008 edition)" issued by the Japan Automobile Tyre Manufacturers Association. Note that, in a case where the TRA Standard, the ETRTO Standard or the like is applied in a region where it is used or manufactured, the above-mentioned Standard should comply with each of the Standards.

Configuration of Tread

As shown in FIG. 1, a tread 10 of the pneumatic tire T1 according to the present embodiment includes plural circumferential main grooves 50A extending in a tire circumferential direction, and plural land portions 11 and 12 divided by the circumferential main grooves 50A. The "land portions" include blocks and ribs on the tread 10.

In the pneumatic tire T1, the three land portions (ribs) 11 is formed, by the three circumferential main grooves 50A, at a central region of the tread 10. In addition, a pair of the land portions 12 is formed at both side regions of the tread 10. A tread pattern is formed by these land portions 11 and 12 (and small grooves formed on the land portions 11 and 12) and the circumferential main grooves 50A.

Configuration of Circumferential Main Groove

As shown in FIG. 2 (a cross-sectional view along a width direction), in the pneumatic tire T1, the land portion 11 is formed so as to be interposed between the circumferential main grooves 50A, and the circumferential main groove 50A has a groove bottom surface 51, groove wall surfaces 52 (52a and 52b), and curved portions (groove bottom corners) 53 (53a and 53b) connecting the groove bottom surface 51 with the groove wall surfaces 52. In the present embodiment, the groove bottom surface 51 and the groove wall surfaces 52 are formed flat, but not limited to be flat. The groove bottom surface 51 and the groove wall surfaces 52 may be formed to be curved with a curvature radius larger than a curvature radius of the curved portions 53.

The curved portions 53 includes an outside curved portion 53a on an installation outer side and an inside curved portion 53b on an installation inner side. In a cross-sectional groove view (the cross-sectional view along the width direction), (a minimum curvature radius R1 of the outside curved portion 53a)>(a minimum curvature radius R2 of the inside curved portion 53b) is satisfied. The reason why the "minimum" curvature radius is used here is that the curved portion 53 (53a or 53b) may be formed with a uniform curvature radius, or may be formed so that its curvature radius varies continuously. In the present embodiment, each of the curved portions 53 (53a or 53b) is formed with a uniform curvature radius so as to connect the flat groove bottom surface 51 continuously with the flat groove wall surface 52 (52a or 52b).

Further, in the cross-sectional groove view (the cross-sectional view along the width direction), with respect to angles (groove wall angles) of the groove wall surfaces 52 to a tread normal line(s) N at border edges between the groove wall surfaces 52 and a tread surface 60, an inequality (the groove wall angle α on the installation outer side)<(the groove wall angle β on the installation inner side) is satisfied. Note that, with respect to the installation outer side, the angle of the outside groove wall surface 52a to the tread normal line N at the border edge between the outside groove wall surface 52a and the tread surface 60a is the groove wall angle α (≥0). Similarly, with respect to the installation inner side, the angle of the inside groove wall surface 52b to the tread normal line N at the border edge between the inside groove wall surface 52b and the tread surface 60b is the groove wall angle β (≥0).

In addition, it is preferable that the minimum curvature radius R1 of the outside curved portion 53a is not more than twice the minimum curvature radius R2 of the inside curved portion 53b. Further, it is preferable that the groove wall angle β on the installation inner side is in a range from (the groove wall angle α on the installation outer side+2°) to (α+30°) [i.e. (α+2°)≤β≤(α+30°)], and it is more preferable that it is in a range from (α+2°) to (α+10°) [i.e. (α+2°)≤β≤(α+10°)]. For example, in a case of α=10°, β=12°~40° is preferable. Note that FIG. 2 shows a case where α=10° and β=12°.

In addition, in the present embodiment as shown in FIG. 2, beveled portions 61 are formed between the groove wall surfaces 52 and the tread surface 60. Note that, with respect to the installation outer side, the outside beveled portion 61a is formed between the outside groove wall surface 52a and the tread surface 60a, and, with respect to the installation inner side, the inside beveled portion 61b is formed between the inside groove wall surface 52b and the tread surface 60b. Namely, the tread surface 60a has the outside beveled portion 61a adjacently to the outside groove wall surface 52a on the installation outer side, and the tread surface 60b has the inside beveled portion 61b adjacently to the inside groove wall surface 52b on the installation inner side.

In the cross-sectional groove view (the cross-sectional view along the width direction), when a distance along a tire radial direction from an uppermost portion of the land portion 11 to the border edge between the outside beveled portion 61a and the outside groove wall surface 52a is denoted as H1 and a distance along a tire radial direction from an uppermost portion of the land portion 11 to the border edge between the inside beveled portion 61b and the inside groove wall surface 52b is denoted as H2, an inequality H1>H2 is satisfied. The reason why this configuration is adopted is to untangle a concern that a ground contact pressure on a side where the above-mentioned (minimum) curvature radius is larger (a ground contact pressure of the land portion 11 on the installation outer side in this case) becomes high.

The above-mentioned configurations with respect to the cross-sectional groove view (the cross-sectional view along the width direction) may be applied to all of the circumferential main grooves 50A, or may be applied only to the circumferential main grooves 50A in the central region that are close to a tire equator line. In consideration to cornering performance, they can be applied only to the circumferential main grooves 50A on the installation outer side from the tire equator line. In the present embodiment, the above-mentioned configurations are applied to all of the circumferential main grooves 50A. In the present embodiment, as shown in FIG. 1, the four circumferential main grooves 50A are formed in total, the two circumferential main grooves 50A in the central region and the two circumferential main grooves 50A on outer sides thereof. Here, in a case of a tire whose installation side to a vehicle is designated, stiffness of the land portions 11 and 12 on the installation outer side to which large loads apply during cornering can be made high by making the groove wall angles α and β larger as they get closer to the installation outer side.

Advantages of Embodiment

According to the pneumatic tire T1 in the embodiment, an effect for supporting an installation inner side portion of the land portion 11 located on the installation inner side from the circumferential main groove 50A improves, and thereby the land portion 11 can resist effectively against a lateral input force from the installation outer side during cornering (the pneumatic tire T1 locates on a cornering outer side). As the result, an inclining deformation of the land portion(s) 11 can be restricted to improve handling stability.

In addition, if the curvature radii of the curved portions 53 are enlarged, the curved portions 53 intrude into the inside of the circumferential main groove 50A in proportion to their enlarged amounts. Therefore, a cross-sectional area of the circumferential main groove 50A decreases, so that water drainage performance may be degraded. However, in the present embodiment, only the minimum curvature radius R1 of the outside curved portion 53a is relatively enlarged, so that water drainage performance can be prevented from degrading and handling stability can be improved.

In addition, if the curved portions 53 are made asymmetric, strain concentrates to the smaller curvature side and cracks may occur. However, (the groove wall angle α on the installation outer side)<(the groove wall angle β on the installation inner side) is satisfied in the present embodiment, local concentration of stain can be prevented. Specifically, since the groove wall angle β with the smaller curvature on the installation inner side is made larger (than the groove wall angle α with the larger curvature on the installation outer side), concentration of stain to the curved portion 53b with the smaller curvature on the installation inner side can be avoided while a lateral input force is applied from the outer side (in a case where the tire T1 is a cornering outer-side wheel), and thereby an inclining deformation of the land portion 11 adjacent to the curved portion 53b can be restricted to improve handling stability. In addition, since the concentration of stain to the curved portion 53b can be avoided, occurrence of cracks can be also restricted.

Further, due to balancing of the groove wall angles α and β, the minimum curvature radii R1 and R2 of the curved portions 53 (53a and 53b), and the distances H1 and H2 along the tire radial direction from the uppermost portion of the land portion 11 to the border edges between the beveled portions 61 (61a and 61b) and the groove wall surfaces 52 (52a and 52b) that are mentioned above, a stiffness balance along the tire width direction of the groove wall surfaces 52 (52a and 52b) (i.e. the land portions 11 on the installation outer and inner sides) with respect to the center of the circumferential main groove 50A can be equalized, so that water drainage performance and anti-crack performance can be improved in this point.

Specifically, (the groove wall angle α on the installation outer side)<(the groove wall angle β on the installation inner side) is satisfied with respect to the groove wall angles α and β, but (the distance H1 on the installation outer side)>(the distance H2 on the installation inner side) is satisfied with respect to the distances H1 and H2, namely their inequality signs are reversal. As the result, a stiffness balance along the tire width direction between the land portion 11 on the installation outer side and the land portion 11 on the installation inner side can be equalized.

In addition, if the minimum curvature radius R1 of the outside curved portion 53a is more than twice the minimum curvature radius R2 of the inside curved portion 53b, the stiffness balance along the tire width direction between the groove wall surfaces 52 (52a and 52b) degrades and thereby uneven wear or degradation of handling stability may occur. However, since the minimum curvature radius R1 of the outside curved portion 53a is not more than twice the minimum curvature radius R2 of the inside curved portion 53b, uneven wear or degradation of handling stability doesn't occur.

In addition, it becomes hard to balance handling stability and water drainage performance optimally when the groove wall angle on the installation inner side is less than (the groove wall angle α on the installation outer side+2°), and the stiffness balance along the tire width direction between the groove wall surfaces 52 (52a and 52b) may degrade when it gets more than (α+30°). Since the groove wall angle β on the installation inner side is in a range from (the groove wall angle α on the installation outer side+2°) to (α+30°) in the present embodiment, handling stability and water drainage performance can be kept at a high level. Especially, if the groove wall angle β on the installation inner side is in a range from (the groove wall angle α on the installation outer side+2°) to (α+10°), the stiffness balance along the tire width direction between the groove wall surfaces 52 (52a and 52b) can be surely restricted from degrading.

In addition, if stiffness of the groove wall surfaces 52 (52a and 52b) is strengthened, a ground contact pressure at side edges of the land portion 11 becomes large and thereby it is concerned that local wear occurs. However, since the beveled portions 61 are formed between the groove wall surfaces 52 and the tread surface 60 in the present embodiment, it is possible to restrict the wear by reducing the ground contact pressure at side edges of the beveled portions 61 (the side edges of the land portion 11, side edges of the tread surface 60).

Note that it is preferable that the minimum curvature radius R1 of the outside curved portion 53a is 3 mm to 12 mm. If R1 is less than 3 mm, handling stability may degrade due to degradation of the stiffness of the groove wall surfaces 52 against a lateral input force, and, if it is more than 12 mm, water drainage performance may degrade due to reduction of the cross-sectional area of the circumferential main groove 50A.

On the other hand, it is preferable that the minimum curvature radius R2 of the inside curved portion 53b is 2 mm to 6 mm. If R2 is less than 2 mm, anti-crack performance may degrade due to concentration of strain, and, if it is more than 6 mm, water drainage performance may degrade due to reduction of the cross-sectional area of the circumferential main groove 50A.

In addition, it is preferable that the groove wall angles α and β are in a range from 0 to 30°.

Comparative Sample

A circumferential main groove 50B of a pneumatic tire T2 according to a comparative sample will be described with reference to FIG. 3. Note that identical configurations to those in the above embodiment will be labeled with identical signs and their redundant descriptions will be omitted.

In the circumferential main groove 50A of the pneumatic tire T1 according to the above embodiment, (the groove wall angle α on the installation outer side)<(the groove wall angle β on the installation inner side) is satisfied. On the other hand, in the circumferential main groove 50B of the pneumatic tire T2 according to the present comparative sample, (the groove wall angle α on the installation outer side)=(the groove wall angle β on the installation inner side) is satisfied. Note that FIG. 3 shows a case where α=β10°.

Characteristics of the pneumatic tires according to the prior art, the comparative sample, and the embodiment (samples 1 to 3) that are mentioned above will be shown in a [Table 1] shown below. Comparative tests were done by using the prior art, the comparative sample, and the embodiment (samples 1 to 3). Although the tests will be explained later, the [Table 1] also shows results of the tests.

Note that F1/F2 in the [Table 1] will be explained. As shown in FIG. 2 to FIG. 4, F1 is a cross-sectional area of an area enclosed by the outside curbed portion 53a (101), an extended line of the groove bottom surface 51 (107), and an extended line of the outside groove wall surface 52a in the cross-sectional groove view (the cross-sectional view along the width direction). Similarly, F2 is a cross-sectional area of an area enclosed by the inside curbed portion 53b (102), another extended line of the groove bottom surface 51 (107), and an extended line of the inside groove wall surface 52b in the cross-sectional groove view (the cross-sectional view along the width direction). F1/F2 is an area ratio of these F1 and F2. Note that, if the area ratio F1/F2 is less than 0.5, handling stability doesn't improve against a lateral input force from the outer side, and, if it is more than 8, water drainage performance degrades due to inhibition of flowability in the circumferential main groove 50A (50B, 100). In addition, if the area ratio F1/F2 is more than 8, difference of strain between the outside curved portion 53a (101) and the inside curved portion 53b (102) becomes large, and thereby cracks easily occur. Therefore, it is preferable that the area ratio is 1.5 to 8.0, and, especially, it is more preferable that it is 1.5 to 3.0. If the area ratio F1/F2 is not more than 3.0, it is possible to balance handling stability, water drainage performance and anti-crack performance at a high level.

TABLE 1

|  | Prior Art | Comparative Sample | Embodiment | | |
|---|---|---|---|---|---|
|  |  |  | Sample 1 | Sample 2 | Sample 3 |
| FIG. | FIG. 4 | FIG. 3 |  | FIG. 2 |  |
| R1 (mm) |  | 3.0 |  | 4.0 | 5.0 |
| R2 (mm) |  |  | 2.0 |  |  |
| α, β | α > β | α = β |  | α < β |  |
| F1/F2 |  |  | 1.5-8.0 |  |  |
| Cracks on Groove Bottom | Occur |  | Not Occur |  |  |
| Ride Comfort | 100 | 101 | 105 |  | 103 |
| Handling Stability (Dry/Wet Road) | 100 | 101 | 106 |  | 104 |

In the tests, a tire having a size 195/65R15 is mounted on a rim having a size 6J. Note that a load is 4 kN, and a tire inner pressure is 210 kPa (evaluations for ride comfort and handling stability). In addition, by using a drum test machine with a 7 m diameter, it is run 30,000 km at 60 km/h by rotating its drum in a state where a load 3.78 N is applied (evaluation for cracks on groove bottom). Note that handling stability at the lowermost row in the [Table 1] is shown as a relative evaluation under a condition where the prior art is evaluated as 100, and handling stability becomes better as its value gets higher.

As being obvious from the [table 1], in the pneumatic tire(s) T1 according to the embodiment samples 1 to 3, no crack occurs on the bottoms of the circumferential main grooves 50A. On the other hand, in the pneumatic tire T10 according to the prior art and the pneumatic tire T2 according to the comparative sample, cracks occur on the bottoms of the circumferential main grooves 50B and 100. The pneumatic tire(s) T1 according to the embodiment samples 1 and 2 gets a good evaluation "105" with respect to ride comfort. In addition, the pneumatic tire(s) T1 according to the embodiment samples 1 and 2 also gets a good evaluation "106" with respect to handling stability on dry and wet roads.

Hereinbefore, although the present invention is described in detail by using the above embodiment, it is obvious for a parson ordinarily skilled in the art that the present invention is not limited to the embodiment described in this Description. The present invention can be carried out as modified and changed embodiments without departing from the sprit and scope of the present invention determined by Claims. Therefore, descriptions in this Description intend to be exemplary explanations, and don't intend to add any limiting meanings to the present invention.

All contents of Japanese Patent Application No. 2014-104046 (filed on May 20, 2014) are incorporated into this Description by reference. Although the present invention is described by referring the embodiment according to the present invention hereinbefore, the present invention is not limited to the above-described embodiment. Scope of the present invention is determined with reference to Claims.

The invention claimed is:

1. A pneumatic tire comprising:
   a tread that has a tread surface;
   a plurality of circumferential main grooves that are formed on the tread; and
   a plurality of land portions that are formed, on the tread, between the plurality of circumferential main grooves, wherein
   each of the plurality of circumferential main grooves has, in a lateral cross-sectional view, a groove bottom surface, an outside groove wall surface located on an installation outer side, an inside groove wall surface located on an installation inner side, an outside curved portion connecting the groove bottom surface with the outside groove wall surface, and an inside curved portion connecting the groove bottom surface with the inside groove wall surface,
   (a minimum curvature radius of the outside curved portion)>(a minimum curvature radius of the inside curved portion) is satisfied in the lateral cross-sectional view,
   the minimum curvature radius of the outside curved portion is not more than twice the minimum curvature radius of the inside curved portion,
   when, in the lateral cross-sectional view, an angle of the outside groove wall surface to a tread normal line at a border edge between the outside groove wall surface and the tread surface is denoted as a groove wall angle α and an angle of the inside groove wall surface to a tread normal line at a border edge between the inside groove wall surface and the tread surface is denoted as a groove wall angle β, (the groove wall angle α)<(the groove wall angle β) is satisfied, and
   in the plurality of circumferential main grooves, (the groove wall angle α of the circumferential main groove located on an installation outer side)>(the groove wall angle α of the circumferential main groove located on an installation inner side), and (the groove wall angle β of the circumferential main groove located on an installation outer side)>(the groove wall angle β of the circumferential main groove located on an installation inner side),
   the groove wall angle β is in a range from (the groove wall angle α+2°) to (the groove wall angle α+10°), and
   when, in the lateral cross-sectional view, a cross-sectional area of an area enclosed by the outside curved portion, an extended line of the groove bottom surface, and an extended line of the outside groove wall surface is denoted as F1, and a cross-sectional area of an area enclosed by the inside curved portion, another extended line of the groove bottom surface, and an extended line of the inside groove wall surface is denoted as F2, a relationship of 1.5≤F1/F2≤3.0 is satisfied.

2. The pneumatic tire according to claim 1, wherein the tread surface has beveled portions adjacent to the outside groove wall surface and the inside groove wall surface.

3. The pneumatic tire according to claim 2, wherein the beveled portions includes an outside beveled portion adjacent to the outside groove wall surface and an inside beveled portion adjacent to the inside groove wall surface, and,
   when a distance along a tire radial direction from an uppermost portion of the land portion on which the outside beveled portion is formed to the border edge between the outside beveled portion and the outside groove wall surface is denoted as H1 and a distance along a tire radial direction from an uppermost portion of the land portion on which the inside beveled portion is formed to the border edge between the inside beveled portion and the inside groove wall surface is denoted as H2, H1>H2 is satisfied.

4. A pneumatic tire comprising:
a tread that has a tread surface;
a plurality of circumferential main grooves that are formed on the tread; and
a plurality of land portions that are formed, on the tread, between the plurality of circumferential main grooves, wherein
each of the plurality of circumferential main grooves has, in a lateral cross-sectional view, a groove bottom surface, an outside groove wall surface located on an installation outer side, an inside groove wall surface located on an installation inner side, an outside curved portion connecting the groove bottom surface with the outside groove wall surface, and an inside curved portion connecting the groove bottom surface with the inside groove wall surface,
(a minimum curvature radius of the outside curved portion)>(a minimum curvature radius of the inside curved portion) is satisfied in the lateral cross-sectional view,
the minimum curvature radius of the outside curved portion is not more than twice the minimum curvature radius of the inside curved portion,
the minimum curvature radius of the outside curved portion is 3 mm to 12 mm, and the minimum curvature radius of the inside curved portion is 2 mm to 6 mm,
when, in the lateral cross-sectional view, an angle of the outside groove wall surface to a tread normal line at a border edge between the outside groove wall surface and the tread surface is denoted as a groove wall angle α and an angle of the inside groove wall surface to a tread normal line at a border edge between the inside groove wall surface and the tread surface is denoted as a groove wall angle β, (the groove wall angle α)<(the groove wall angle β) is satisfied,
in the plurality of circumferential main grooves, (the groove wall angle α of the circumferential main groove located on an installation outer side)>(the groove wall angle α of the circumferential main groove located on an installation inner side), and (the groove wall angle β of the circumferential main groove located on an installation outer side)>(the groove wall angle β of the circumferential main groove located on an installation inner side),
the groove wall angles α and β are in a range from 0° to 30°,
the groove wall angle β is in a range from (the groove wall angle α+2°) to (the groove wall angle α+10°),
when, in the lateral cross-sectional view, a cross-sectional area of an area enclosed by the outside curved portion, an extended line of the groove bottom surface, and an extended line of the outside groove wall surface is denoted as F1, and a cross-sectional area of an area enclosed by the inside curved portion, another extended line of the groove bottom surface, and an extended line of the inside groove wall surface is denoted as F2, a relationship of 1.5≤F1/F2≤3.0 is satisfied,
the tread surface has beveled portions adjacent to the outside groove wall surface and the inside groove wall surface,
the beveled portions includes an outside beveled portion adjacent to the outside groove wall surface and an inside beveled portion adjacent to the inside groove wall surface, and
when a distance along a tire radial direction from an uppermost portion of the land portion on which the outside beveled portion is formed to the border edge between the outside beveled portion and the outside groove wall surface is denoted as H1, and a distance along a tire radial direction from an uppermost portion of the land portion on which the inside beveled portion is formed to the border edge between the inside beveled portion and the inside groove wall surface is denoted as H2, H1>H2 is satisfied.

* * * * *